US012803485B2

(12) United States Patent
Biskup et al.

(10) Patent No.: US 12,803,485 B2
(45) Date of Patent: Nov. 17, 2026

(54) FAULT CONDITION HANDLING IN AN ELECTRIC VEHICLE POWERTRAIN

(71) Applicant: Atieva, Inc., Newark, CA (US)

(72) Inventors: Richard J. Biskup, Sunnyvale, CA (US); Rambabu Surada, Fremont, CA (US); Jia Li, Sunnyvale, CA (US)

(73) Assignee: Atieva, Inc., Newark, CA (US)

( * ) Notice: Subject to any disclaimer, the term of this patent is extended or adjusted under 35 U.S.C. 154(b) by 202 days.

(21) Appl. No.: 18/703,968

(22) PCT Filed: Oct. 21, 2022

(86) PCT No.: PCT/US2022/078505
§ 371 (c)(1),
(2) Date: Apr. 23, 2024

(87) PCT Pub. No.: WO2023/076837
PCT Pub. Date: May 4, 2023

(65) Prior Publication Data

US 2025/0007442 A1 Jan. 2, 2025

Related U.S. Application Data

(60) Provisional application No. 63/263,196, filed on Oct. 28, 2021.

(51) Int. Cl.
*H02P 27/06* (2006.01)
*B60L 3/12* (2006.01)
(Continued)

(52) U.S. Cl.
CPC .............. *H02P 29/028* (2013.01); *B60L 3/12* (2013.01); *B60L 15/007* (2013.01);
(Continued)

(58) Field of Classification Search
CPC ........ B60L 3/0046; B60L 3/0061; B60L 3/12; B60L 50/51; B60L 3/04; B60L 3/003;
(Continued)

(56) References Cited

U.S. PATENT DOCUMENTS 7,279,862 B1 * 10/2007 Welchko .................. G05B 9/02 318/563
2008/0304189 A1 12/2008 Tang et al.
(Continued)

FOREIGN PATENT DOCUMENTS

CN 101120504 A 2/2008

OTHER PUBLICATIONS

International Search Report and Written Opinion for PCT Application No. PCT/US2022/078505, mailed on Feb. 6, 2023, 11 pages.
Extended European Search Report for European Application No. 22888398.9, dated Aug. 28, 2025, 12 pages.

*Primary Examiner* — Gabriel Agared
(74) *Attorney, Agent, or Firm* — Brake Hughes Bellermann LLP

(57) ABSTRACT

A motor controller may be used to detect an operating fault associated with operation of a powertrain of an electric vehicle. The powertrain can include a permanent magnet motor, a multi-phase inverter that is operationally coupled with the permanent magnet motor, and a rotational position sensor that is operationally coupled with the permanent magnet motor. A classification of the operating fault and a present speed of the permanent magnet motor may be determined. In response to the detection of the operating fault and, based on at least one of the classification of the operating fault and the present speed of the permanent magnet motor, the motor controller may perform a fault reaction operation.

17 Claims, 3 Drawing Sheets

(51) Int. Cl.

| | |
|---|---|
| ***H02P 29/024*** | (2016.01) |
| ***H02P 29/028*** | (2016.01) |
| ***H02P 29/032*** | (2016.01) |
| *B60L 15/00* | (2006.01) |

(52) U.S. Cl.
CPC ..... *B60L 2240/12* (2013.01); *B60L 2240/421* (2013.01); *B60L 2240/423* (2013.01); *B60L 2240/547* (2013.01)

(58) Field of Classification Search
CPC ......... B60L 2240/421; B60L 2240/423; B60L 2210/40; B60L 2240/429; B60L 2240/12; B60L 2220/14; B60L 2240/547; B60L 15/007; B60L 2240/427; H02P 29/024; H02P 27/06; H02P 29/028; H02P 29/032; H02H 7/0838; H02H 3/023; H02H 7/09; H02H 7/0805; H02H 7/08
USPC ...................................................... 318/400.21
See application file for complete search history.

(56) References Cited

U.S. PATENT DOCUMENTS

| | | | | |
|---|---|---|---|---|
| 2011/0006713 | A1 | 1/2011 | Wichowski | |
| 2013/0043816 | A1* | 2/2013 | Welchko | H02M 1/32 318/400.21 |
| 2013/0270974 | A1* | 10/2013 | Wang | G01R 31/58 310/68 R |
| 2014/0098586 | A1 | 4/2014 | Jeong et al. | |
| 2014/0245071 | A1 | 8/2014 | Drees et al. | |
| 2015/0175010 | A1 | 6/2015 | Tang | |
| 2017/0052208 | A1* | 2/2017 | Reddy | G01P 21/02 |
| 2017/0305274 | A1 | 10/2017 | Saha et al. | |
| 2019/0001782 | A1 | 1/2019 | Anderson et al. | |
| 2020/0066066 | A1* | 2/2020 | Hu | F02D 41/3082 |
| 2020/0220479 | A1 | 7/2020 | Miyazaki et al. | |
| 2021/0197839 | A1* | 7/2021 | Shabestari | H02P 21/06 |

* cited by examiner

FAULT CONDITION HANDLING IN AN ELECTRIC VEHICLE POWERTRAIN

CROSS-REFERENCE TO RELATED APPLICATIONS

This application is a 35 U.S.C. § 371 National Phase Entry Application from PCT Application No. PCT/US2022/078505, filed on Oct. 21, 2022, entitled "FAULT CONDITION HANDLING IN AN ELECTRIC VEHICLE POWERTRAIN", and designating the U.S., which claims the priority benefit of U.S. Provisional Application No. 63/263,196, entitled "FAULT CONDITION HANDLING IN AN ELECTRIC VEHICLE POWERTRAIN", filed Oct. 28, 2021, the disclosures of which are hereby incorporated by reference in their entireties.

TECHNICAL FIELD

This document relates to approaches for reacting to fault conditions that can occur during operation of an electric vehicle powertrain.

BACKGROUND

In recent years, electric vehicle (EV) technology has continued to develop, and an increasing number of people are choosing to have an EV as a personal vehicle. As in other types of vehicles, fault conditions can occur in an EV, such as fault conditions associated with operation of an EV's powertrain. Current approaches for handling such fault conditions may not take into account the nature of the fault and/or present vehicle operating conditions, such as vehicle speed.

SUMMARY

In a general aspect, a method can include detecting, by a motor controller, an operating fault associated with operation of a powertrain of an electric vehicle. The powertrain can include a permanent magnet motor, a multi-phase inverter that is operationally coupled with the permanent magnet motor, and a rotational position sensor that is operationally coupled with the permanent magnet motor. The method can further include determining a classification of the operating fault and determining a present speed of the permanent magnet motor. The method can also include, in response to the detection of the operating fault and, based on at least one of the classification of the operating fault and the present speed of the permanent magnet motor, performing, by the motor controller, a fault reaction operation, the fault reaction operation.

Implementations can include one or more of the following features, or any combination thereof. For example, the multi-phase inverter can include a three-phase inverter having a high-side and a low-side. The fault reaction operation can include one of: applying a high-side, three-phase short in the three-phase inverter; applying a low-side, three-phase short in the three-phase inverter; applying low-side and high-side three-phase open circuit in the three-phase inverter; or setting a torque command for the permanent magnet motor to zero.

If the present speed is above a first threshold speed, the method can include applying a first fault reaction operation. If the present speed is a below a second threshold speed, the method can include applying a second fault reaction operation that is different than the first fault reaction operation, the second threshold speed being less than the first threshold speed. The first threshold speed can be less than or equal to a base speed of the permanent magnet motor. The base speed can be a speed at which a back electromotive force (EMF) voltage of the permanent magnet motor is greater than a battery voltage of the powertrain of the electric vehicle.

The operating fault can be a first operating fault, and the method can include detecting, by the motor controller, a second operating fault associated with operation of the powertrain of the electric vehicle. Performing the fault reaction operation can be further based on respective priorities of the first operating fault and the second operating fault. The respective priorities can be included in a set of predetermined priorities. Operating fault conditions, from a highest predetermined priority to a lowest predetermined priority, can include power electronics operating faults, speed sensor operating faults, vehicle speed operating faults, torque generation operating faults, and powertrain operation warnings.

The operating fault can be detected by a processor included in the motor controller. The operating fault can be detected by a field programmable gate array (FPGA) included in the motor controller.

In another general aspect, a vehicle includes a powertrain having a permanent magnet motor, a multi-phase inverter that is operationally coupled with the permanent magnet motor, and a rotational position sensor that is operationally coupled with the permanent magnet motor. The vehicle also includes a motor controller configured to detect an operating fault associated with operation of the powertrain, determine a classification of the operating fault, and determine a present speed of the permanent magnet motor. The motor controller is also configured to, in response to the detection of the operating fault and, based on at least one of the classification of the operating fault and the present speed of the permanent magnet motor, perform a fault reaction operation.

Implementations can include one or more of the following features, or any combination thereof. For example, the multi-phase inverter can include a three-phase inverter having a high-side and a low-side. The fault reaction operation includes one of applying a high-side, three-phase short in the three-phase inverter, applying a low-side, three-phase short in the three-phase inverter, applying low-side and high-side three-phase open circuit in the three-phase inverter, or setting a torque command for the permanent magnet motor to zero.

If the present speed is above a first threshold speed, the motor controller can be configured to apply a first fault reaction operation. If the present speed is below a second threshold speed, the motor controller can be configured to apply a second fault reaction operation that is different than the first fault reaction operation. The second threshold speed can be less than the first threshold speed. The first threshold speed can be less than or equal to a base speed of the permanent magnet motor. The base speed can be a speed at which a back electromotive force (EMF) voltage of the permanent magnet motor is greater than a battery voltage of the powertrain of the vehicle.

The operating fault can be a first operating fault. The motor controller can be further configured to detect a second operating fault associated with operation of the powertrain of the vehicle, and perform the fault reaction operation further based on respective priorities of the first operating fault and the second operating fault. The respective priorities can be included in a set of predetermined priorities.

Operating faults, from a highest predetermined priority to a lowest predetermined priority, can include power electronics operating faults, speed sensor operating faults, vehicle speed operating faults, torque generation operating faults, and powertrain operation warnings.

The motor controller can include a processor configured to detect the operating fault.

The motor controller can include a field programmable gate array (FPGA) configured to detect the operating fault.

BRIEF DESCRIPTION OF DRAWINGS

Like reference symbols in the various drawings indicate like elements.

DETAILED DESCRIPTION

This document describes examples of systems and techniques for handling operational fault conditions in a drive system (e.g., powertrain) of a vehicle, such as an electric vehicle. As used herein, a motor control unit can implement a fault handling strategy using hardware, software and/or firmware. For instance, in example implementations, a motor control unit can include a microprocessor, a microcontroller, a field programmable gate array, etc.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. An EV can be powered exclusively by electricity, or can use one or more other energy sources in addition to electricity, to name just a few examples. As used herein, an EV includes an onboard motor control unit (MCU), sometimes referred to as a motor controller, to control operation of one or more electric motors. In example implementations, an MCU can include electronics (e.g., hardware), software, firmware (e.g., operations implemented by an FPGA, which can be referred to as firmware or hardware implemented FPGA-code), etc. An MCU can be configured to, e.g., using the approaches described herein, to react to fault conditions that can occur during operation of a vehicle, such as fault conditions associated with operation of a powertrain of an EV.

Figure 1:
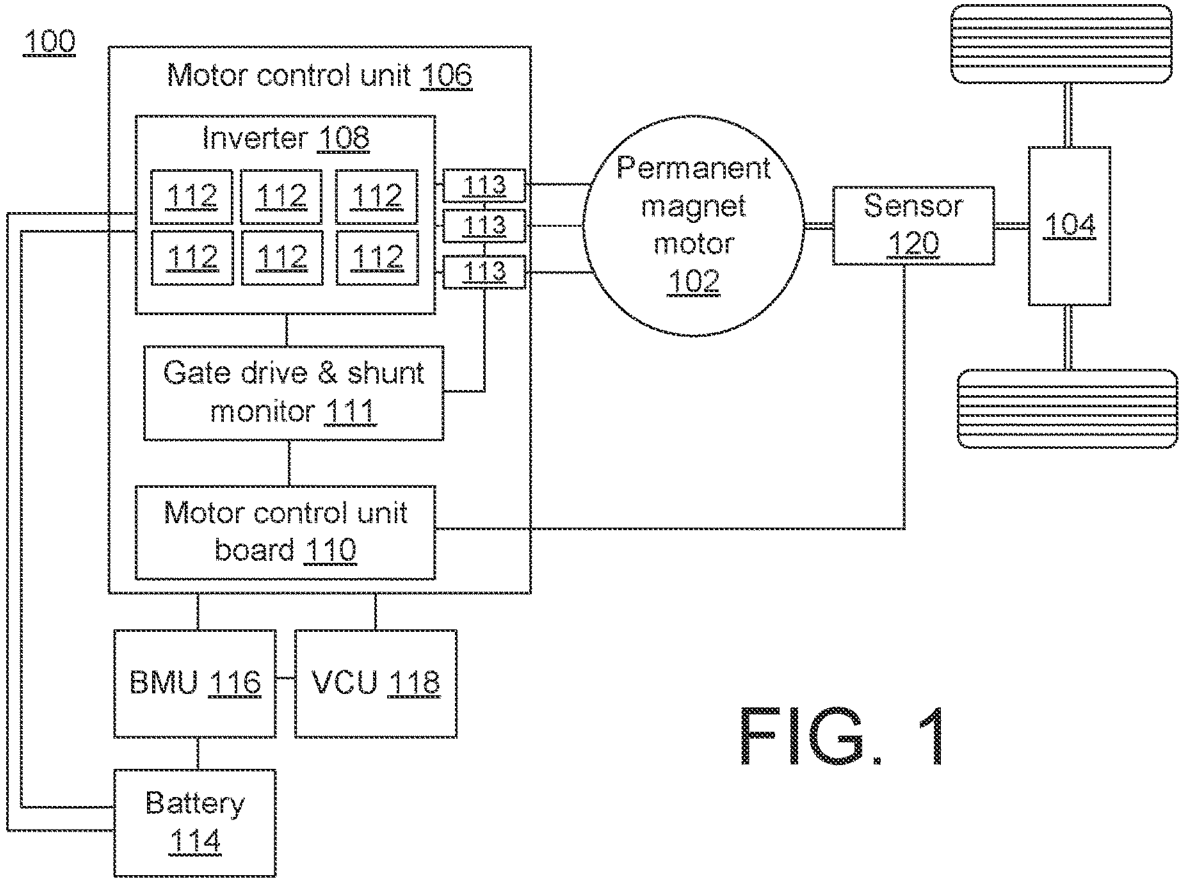
FIG. 1 is a diagram illustrating an example vehicle having a permanent magnet motor.
Figure 2:
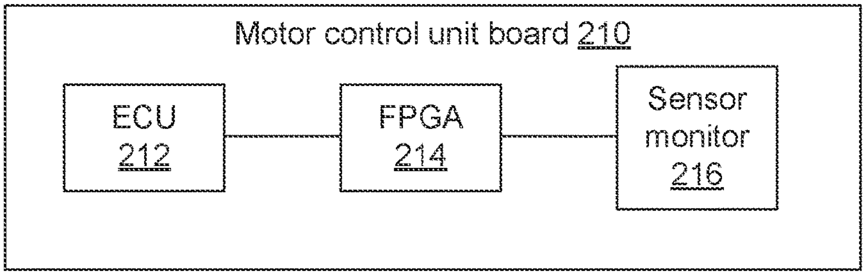
FIG. 2 is block diagram illustrating an example motor control unit that can be implemented in the vehicle of FIG. 1.

FIG. 1 is a diagram showing an example of a vehicle 100 having a permanent magnet motor 102, and FIG. 2 is a block diagram illustrating an example motor control unit board 210 that can be included in the vehicle 100. As shown in FIG. 1, the permanent magnet motor 102 and/or other components of the vehicle 100 can be used with one or more other examples described elsewhere herein. Only portions of the vehicle 100 are shown, for simplicity. The permanent magnet motor 102 has one or more magnets positioned within or on a surface of a rotor. The permanent magnet motor 102 can apply current to a stator (e.g., stator windings) surrounding the rotor to generate torque for one or more drive wheels. In some implementations, gears 104 can be provided between the permanent magnet motor 102 and the drive wheel(s). For example, the gears 104 can include a differential and/or can provide gear reduction.

The vehicle 100 can use a motor controller to operate the permanent magnet motor 102 as well as other components. Here, the vehicle 100 includes a motor control unit (MCU) 106 that includes an inverter 108 and an MCU board 110. The MCU board 110 controls the inverter 108, e.g., via a gate drive and shunt monitor 111. The MCU board 110 can include one or more processing components, such as those described below with respect to FIG. 2. In some implementations, the MCU board 110 includes one or more processors. For example, the MCU board 110 can also include one or more field-programmable gate arrays (FPGAs). The MCU 106 can also include one or more other components for controlling the permanent magnet motor 102. For example, power management/regulation, data communication, and cooling features can be included.

The inverter 108 can include one or more power stages, e.g., a master stage and a slave stage (e.g., which can also respectively be referred to as a high-side and a low-side), to convert direct current (DC) to alternating current (AC) to drive the permanent magnet motor 102 through shunts 113. In this implementation, the shunts 113 can be low resistance elements that are used by shunt monitors of the gate drive and shunt monitor 111 to determine respective currents in stator windings of the permanent magnet motor 102. The inverter 108 can also convert AC to DC when recovering energy from the permanent magnet motor 102, e.g., resulting from a back electromagnetic force (EMF) voltage generated by the permanent magnet motor 102. For instance, the inverter 108 can use transistors 112 that are toggled on and off repeatedly to generate AC (e.g., in the form of pulse width modulated signals) that is provided to the permanent magnet motor 102, or to recover energy from the permanent magnet motor 102. In some implementations, six of the transistors 112 can be coupled in respective pairs to produce three-phase AC.

In an example implementation, the transistors 112 can be metal-oxide semiconductor field-effect transistors (MOSFETs). For example, silicon carbide MOSFETs can be used. In another example implementation, the transistors can be insulated-gate bipolar transistors (IGBT). In example implementations, such as those described herein, the inverter 108 can be a three-phase (e.g., multi-phase) inverter having a high-side (e.g., the upper three transistors 112) and a low-side (e.g., the lower three transistors 112). The MCU 106 can independently control each of the transistors 112 when operating the vehicle and/or when performing fault handling (fault reaction) operations.

The vehicle 100 includes a battery 114. The battery 114 can include one or more modules of electrochemical cells. For example, lithium-ion cells can be used. The battery 114 can be controlled by a battery management unit (BMU) 116. For example, the BMU 116 can manage the state of charge of the battery 114, and open and close contactors between the battery 114 and the inverter 108, e.g., to energize the drive system of the vehicle 100 for operation. The battery 114, which is the energy source for vehicle propulsion, can be referred to as a high-voltage battery to distinguish it from a low-voltage (e.g., 12 V) battery that can power one or more components (e.g., the MCU board 110 and/or the gate drive and shunt monitor 111).

The MCU 106 can determine a base speed for the permanent magnet motor 102. When the permanent magnet motor 102 is spinning, the permanent magnets in the rotor generate a voltage called a back electromotive force (back EMF). The inverter 108 can include freewheeling diodes (e.g., in the form of body diodes of the transistors 112, or as separately implemented diodes). For instance, in implementations where the transistors 112 are implemented as IGBTs, such freewheeling diodes (e.g., discrete diodes) can be respectively implemented in parallel with each of the IGBTs. The back EMF can eventually generate a DC voltage at the DC terminals of the battery 114 (e.g., back EMF voltage). If this DC voltage increases and exceeds the voltage from the battery 114, this can create a potential flow of electrical energy from the permanent magnet motor 102 to the battery 114. Such a condition can be felt in form of a braking torque generated by the permanent magnet motor 102 (sometimes referred to as un-commanded torque, or negative torque), which can skid the tires of the wheels used for propulsion, e.g., in low u conditions (low traction conditions, slippery road conditions, etc.). The boundary where the back EMF exceeds the battery voltage is speed-dependent, and can be referred to as the base speed of the permanent magnet motor 102. The base speed can be calculated based on a back EMF constant and a DC voltage (e.g., a DC link voltage) of the inverter 108. That is, when the vehicle 100 travels slower than the base speed, the transistors 112 can be turned off (e.g., for fault handling) without generating un-commanded torque, or negative torque.

The vehicle 100 includes a vehicle control unit (VCU) 118. The VCU 118 can control the operational state of the vehicle 100. In some implementations, the VCU 118 can be coupled to both the BMU 116 and the MCU board 110. For example, the VCU 118 can coordinate torque requests regarding the permanent magnet motor 102, such as in response to an accelerator pedal of the vehicle being depressed.

The vehicle 100 includes a sensor 120 that can provide signals to indicate a rotational position of the rotor in the permanent magnet motor 102, and provide those indication signals to the motor control unit 106. In some implementations, the sensor 120 can be mounted to a shaft of the rotor and can provide angle (e.g., sine and cosine) measurements. For example, the sensor 120 can include analog circuitry (e.g., a resolver) or digital circuitry (e.g., an encoder) for providing such angle measurements to the MCU 106.

The vehicle 100 can execute a motor control strategy to improve efficiency and provide for safe vehicle operation. Such a motor control strategy can include handling (e.g., reacting to) operating fault conditions that can occur in the vehicle 100's powertrain (drive system) during operation of, such as when driving, the vehicle 100. In some implementations, such handling of fault conditions can be achieved using different operations that are performed based on a specific type (or classification) of operating fault being handled. Such classifications, in order of their importance, can include power electronics faults, speed sensor (resolver) faults, speed-based faults, torque inhibit (torque generation) faults, and/or operational warnings. The specific fault reaction action that is performed can also depend on present operating conditions of the vehicle 100 (e.g., wheel speed and/or rotational speed of the permanent magnet motor 102 at the time of the operational fault), and whether the vehicle speed is above or below the base speed, or above or below thresholds that are respective percentages of the base speed. In example implementations, a hysteresis band can be used (e.g., between an upper speed threshold and a lower speed threshold) when determining an appropriate fault reaction operation to perform.

In the examples described herein, with reference to FIG. 1, operations performed in response to fault conditions can include applying a high-side, three-phase short to the inverter 108, applying a low-side, three-phase short to the inverter 108, simultaneously turning off all of the transistors 112 of the inverter 108 so they are non-conductive, and/or reducing (setting) a torque command (e.g., an amount of torque requested from the permanent magnet motor 102 from the VCU) to zero. Other fault reaction operations are possible, such as displaying a vehicle operation warning, powering the vehicle 100 off, disabling the permanent magnet motor 102, etc.

As used herein, a high-side three-phase short refers to turning on the upper three transistors 112 of the inverter 108 (e.g., so they can conduct current) and turning off the lower three transistors 112 of the inverter 108 (e.g., so they are non-conductive), such as illustrated below with respect to FIG. 4. Further, a low-side three-phase short, as used herein, refers to turning on the lower three transistors 112 of the inverter 108 and turning off the upper three transistors 112 of the inverter 108, such as illustrated below with respect to FIG. 5. Such three-phase shorts (high-side and low-side) electrically couple the stator windings of the permanent magnet motor 102 together, which allows current to circulate between the windings through the applied three-phase short. Such approaches, when the vehicle 100 is operating at or above its base speed, can prevent current flowing back into the battery pack if the inverter 108 is configured to freewheel the current through diodes.

Still further, as used herein, simultaneously turning off all of the transistors 112 of the inverter 108 so they are non-conductive can be referred to as an open-gate, or gate-off state of the inverter 108. A transistor of the transistors 112 being non-conductive, or turned off, corresponds to a state where there is no active path between the positive terminal and a respective phase terminal of the permanent magnet motor 102. As mentioned above, freewheeling diodes can provide a reverse path that is conductive while an associated transistor of the transistors 112 is in a non-conductive state.

As noted above, FIG. 2 is a block diagram illustrating an example MCU board 210 that can be implemented in the vehicle 100 of FIG. 1. For instance, the MCU board 210 can be used to implement the MCU board 110 of the vehicle 100. The MCU board 210 is further described with reference to the vehicle 100 of FIG. 1 as an example.

As shown in FIG. 2, the MCU board 210 can include an engine control unit (ECU) 212, an FPGA 214 and a sensor monitor 216. In the example of FIG. 2, the ECU 212 can include a multiple-core microcontroller or microprocessor that can, in conjunction with the FPGA 214, implement the motor control strategy, including detection and handling of drive system operating faults using the approaches described herein. For instance, in example implementations, the ECU 212 can execute operations (e.g., by executing software instructions) for controlling operation of the permanent magnet motor 102. The FPGA 214 can be configured to control and monitor operation of the permanent magnet motor 102, by executing operations programmed in the FPGA 214 (e.g., firmware, or FPGA-code). For instance, the FPGA 214 can implement operations to measure stator currents through the shunts 113, and to determine angle and speed of the permanent magnet motor 102 based on signals received from the sensor 120 via the sensor monitor 216. The FPGA 214 can also provide signals to the gate drive and shunt monitor 111 for operation of the inverter 108, and for implementing fault reaction operations.

In this example, the ECU 212 and the FPGA 214 can be configured to perform fault control operations in response to operation fault conditions that are detected by MCU board 210 (e.g., detected by the ECU 212 and/or the FPGA 214). In example implementations, faults can be grouped by type and in order of priority for fault handling. For instance, in an example, operating fault conditions can be grouped, from a highest predetermined priority to a lowest predetermined priority, as follows: power electronics operating faults; speed sensor operating faults; vehicle speed operating faults; torque generation operating faults; and powertrain operation warnings. Operating fault conditions can also be grouped based on their associated fault reaction, such as applying a high-side, three-phase inverter short; applying a low-side, three-phase inverter short; performing an open-gate, or gate-off operation; reducing or setting a torque command to zero; and/or displaying a vehicle operation warning. Fault reactions can then be implemented by the MCU 106, e.g., based on their priority grouping and/or their fault reaction grouping using a diagnostic protocol implemented by the MCU 106, such as the Unified Diagnostic Service (UDS) protocol.

In example implementations, for some operating fault conditions, or groups of operating fault conditions, the corresponding fault reaction operation performed can also be based on a current speed of the vehicle (e.g., based on whether it is above or below a threshold speed, such as a base speed, or percentages of the base speed). For instance, for a given fault, if a current speed is below a first threshold, an open-gate operation could be performed, while if the current speed is above a second threshold, a three-phase short (e.g., high-side or low-side) operation could be applied.

Figure 3:
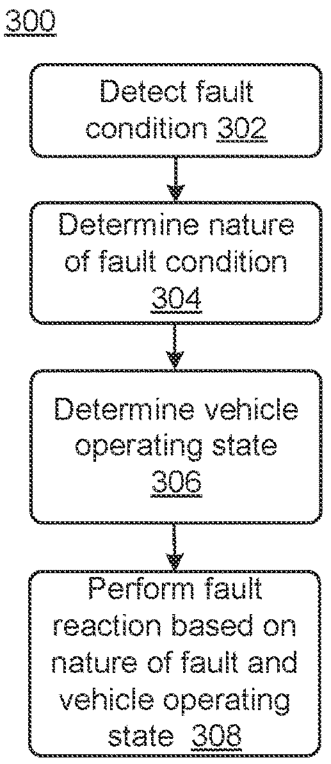
FIG. 3 is a flowchart illustrating fault reaction in a drive system of an electric vehicle (EV), such as the vehicle of FIG. 1.

FIG. 3 is a flowchart illustrating a method 300 for fault condition handling in a drive system of an electric vehicle (EV), such as the vehicle 100 of FIG. 1. In the method 300, at operation 302, an operating fault condition can be detected, e.g., by an MCU. At operation 304, the method includes determine a nature (e.g., type, priority, etc.) of the detected operating fault condition. For instance, as discussed above, a diagnostic protocol can be used to identify operating fault conditions and implement respective fault reactions. In other implementations, a look up table could be implemented (e.g., in the MCU) where an indication of an operational fault (e.g., a fault code name, fault code value, etc.) can be used to index the look up table to determine the nature of the faults and the corresponding fault handling operation to be performed. At block 306, the method 300 includes determining a vehicle operating state (e.g., is a current vehicle speed, or motor speed above or below a base speed, or speed threshold). At operation 308, the method includes performing a fault reaction operation based on the determined nature of the fault and/or on the determined vehicle operating state. In an example implementation, the method 300 can implement operating fault detection and fault reaction operations in accordance with the approaches described herein.

In some implementations, multiple operating fault conditions can occur, or can be detected during a same period of time. In such situations, the fault reaction operation performed at operation 308 of the method 300 can be based on respective priorities of the detected operating faults. For instance, the fault reaction operation associated with a higher priority operating fault condition (e.g., the operating fault having the highest predetermined priority) can be implemented in lieu of implementing the fault condition for a lower priority operating fault condition (e.g., the operating fault having the lowest, or lower predetermined priority). For example, if both a power electronics operation fault, such as failure of a transistor in an inverter, and a torque inhibit operation fault are detected, the fault reaction operation for the power electronic operating fault can be performed, while the fault reaction operation for the torque inhibit fault is not performed.

Figure 4:
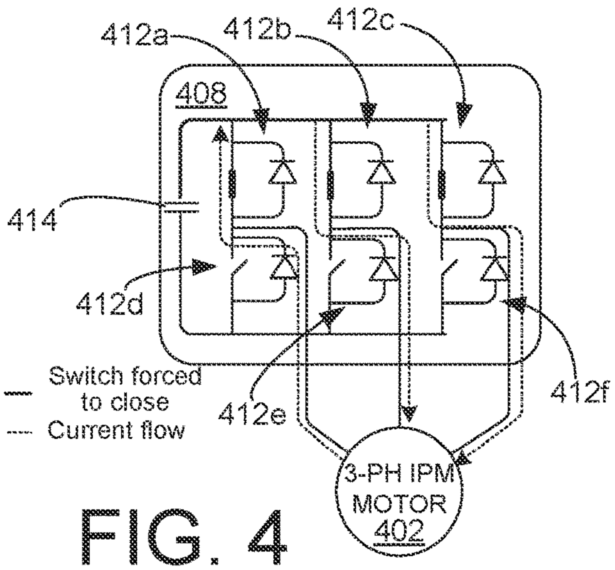
FIGS. 4 and 5 are schematic diagrams illustrating application of three phase shorts that can be used for reacting to various operation faults in an EV, such as the vehicle of FIG. 1.
Figure 5:
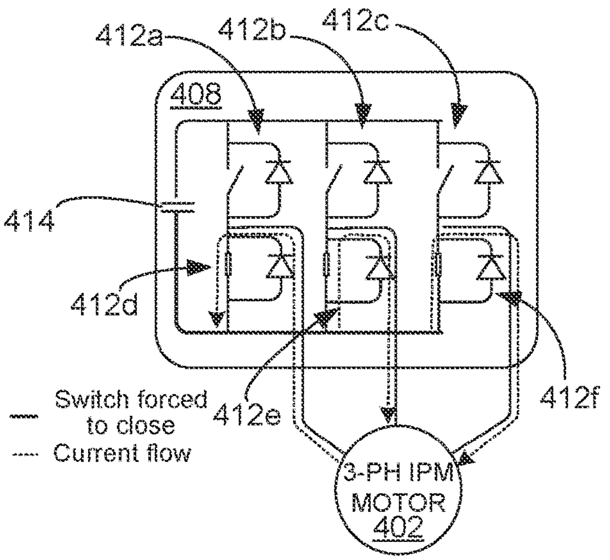
Figure 6:
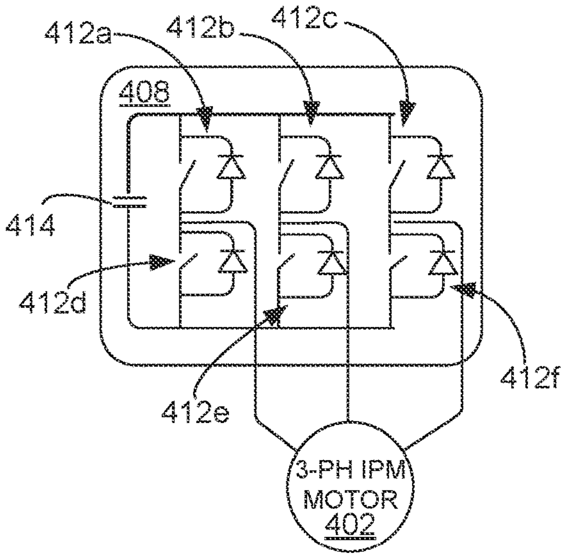
FIG. 6 is a schematic diagram application of a three-phase open gate condition that can be used for reacting to various operation faults in an EV, such as the vehicle of FIG. 1.

FIGS. 4 and 5 are schematic diagrams illustrating application of three-phase shorts (respectively high-side and low-side) that can be used for reacting to various operation faults in an EV drive system, such as in the vehicle 100 of FIG. 1. FIG. 6 is a schematic diagram application of a three-phase open-gate (gate-off) condition that can be used for reacting to various operation faults in an electric vehicle (EV), such as the vehicle 100 of FIG. 1. The fault reaction operations of FIGS. 4-6 are illustrated as being implemented in an inverter 408 that is operationally coupled with a three-phase internal permanent magnet (IPM) motor 402. In some implementations, the inverter 408 and the IPM motor 402 can be included in a vehicle such as the vehicle 100.

The inverter 408 of FIGS. 4-6 is a two-stage, three-phase inverter, where a first (upper, or high-side) stage includes transistors 412*a*, 412*b* and 412*c*, while a second (lower, or low-side) stage includes transistors 412*d*, 412*e* and 412*f*. Also in FIGS. 4-6, the inverter 408 is operationally coupled with a battery 414 (e.g., a high voltage battery) that can provide power for the IPM motor 402 to propel an associated vehicle.

For purposes of illustration, the transistors 412*a*-412*f* are each respectively illustrated with a switch and a freewheeling diode. Depending on the implementation, the freewheeling diodes can be body diodes (e.g., of corresponding MOSFET devices) or discrete diodes (e.g., implemented in parallel with corresponding IGBT devices). The transistor and freewheeling diode arrangement in the inverter 408 will depend on the particular implementation.

Referring to FIG. 4, a high-side, three-phase short is implemented in the inverter 408. That is, the transistors 412*a*-412*c* (as shown by the illustrated switches) are closed, or on, so that they will circulate current from stator windings of the IPM motor 402 through the high-side three-phase short, e.g., as shown by the dashed lines in FIG. 4. In an example implementation, such a fault reaction operation can be implemented as a response to a detected fault, such as in accordance with the examples described herein. In one example, if an operating fault is detected for one or more of the transistors 412*a*-412*c* (e.g., one or more transistors has failed short), the high-side, three-phase short of FIG. 4 can be implemented as a result of an MCU directing the other high-side transistors to turn on. In such a situation, implementing a low-side, three-phase short (e.g., as shown in FIG. 5) would result in a direct conduction path from a positive terminal of the battery 414 to a negative terminal of the battery 414, which could cause a battery fuse (not shown) to blow, resulting in the vehicle being disabled.

Referring to FIG. 5, a low-side, three-phase short is implemented in the inverter 408. That is, the transistors 412*d*-412*f* (as shown by the illustrated switches) are closed, or on, so that they will circulate current from stator windings of the IPM motor 402 through the low-side three-phase short, e.g., as shown by the dashed lines in FIG. 5. Such a fault reaction operation can be implemented as a response to a detected operating fault condition, or group of operating fault conditions. Similar to the high-side, three-phase short shown in FIG. 4, the fault reaction operation of FIG. 5 can be implemented as a response to an operating fault being detected for one or more of the transistors 412*d*-412*f* (e.g., one or more transistors has failed short), the low-side, three-phase short of FIG. 5 can be implemented as a result of an MCU directing the other low-side transistors to turn on. In such a situation, implementing a high-side, three-phase short (e.g., as shown in FIG. 4) would result in a direction conduction path from a positive terminal of the battery 414 to a negative terminal of the battery 414, which could cause a battery fuse (not shown) to blow, resulting in the vehicle being disabled.

Referring to FIG. 6, an open-gate (gate-off) fault reaction operation is implemented in the inverter 408. That is, the transistors 412*a*-412*f* (as shown by the illustrated switches) are open, or off, so that no current will flow through the stator windings of the IPM motor 402. Such a fault reaction operation can be implemented as a response to a detected operating fault condition, such as in accordance with the approaches described herein.

Figure 7:
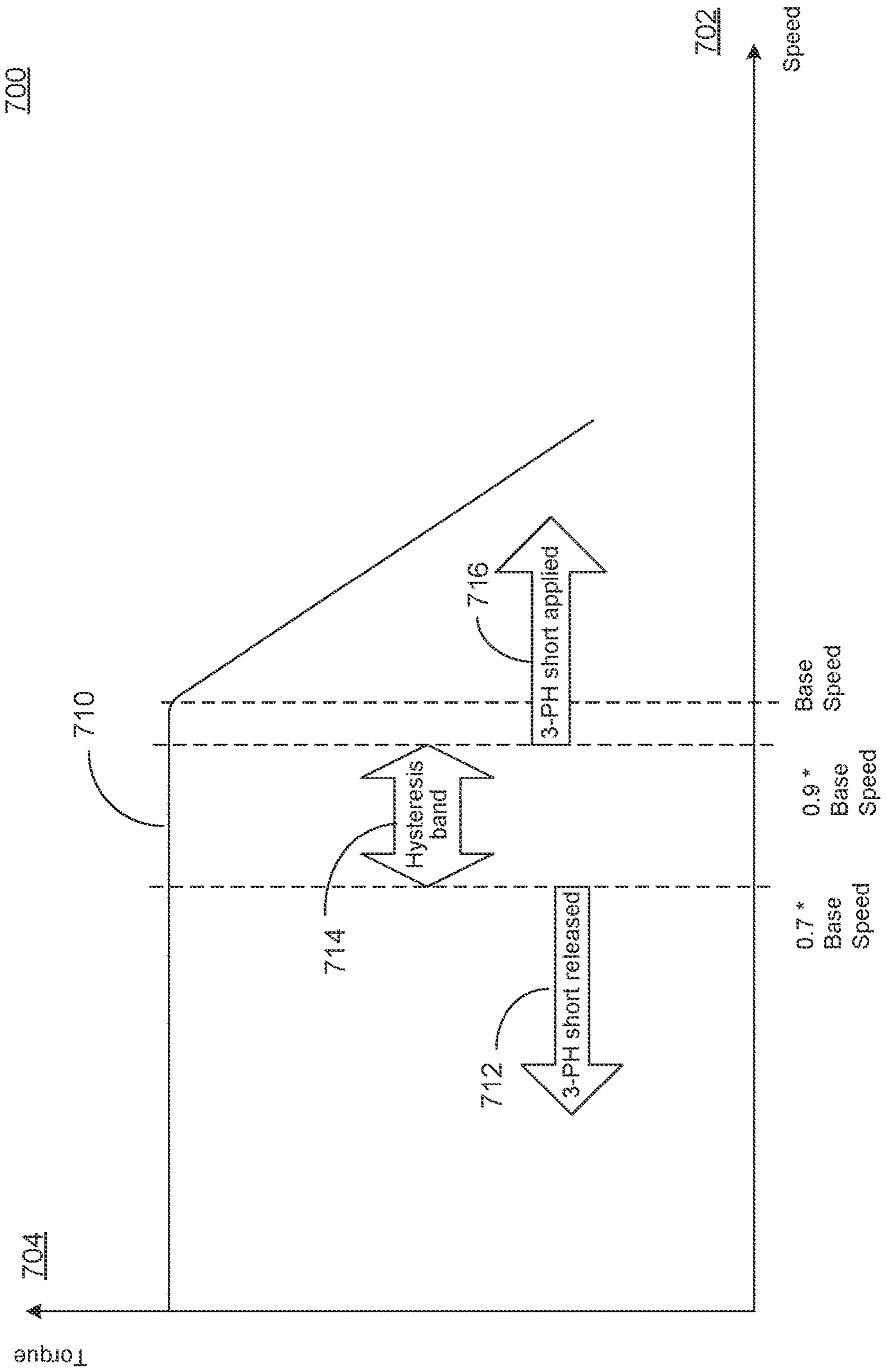
FIG. 7 is a graph illustrating implementation of a hysteresis band for fault reaction in an EV drive system.

FIG. 7 is a graph 700 illustrating implementation of a hysteresis band for fault reaction in an EV drive system. In FIG. 7, motor speed is shown on the x-axis 702 and torque is shown on the y-axis 704. A trace 710 illustrates an example relationship between motor speed, the motor's base speed, and torque. The approach of FIG. 7 can be used for implementing motor speed dependent fault reactions. As shown in FIG. 7, for an example operating fault condition, if the operating fault condition occurs and motor speed is greater than ninety percent of the motor's base speed, a three-phase short can be applied as indicated by the arrow 716. If the motor speed then drops below seventy percent of the base speed, the three-phase short can be released as indicated the arrow 712.

In the hysteresis band 714, the fault reaction applied for the indicated fault will depend on whether speed is increasing or decreasing. For example, if the motor speed is decreasing from more than ninety percent of base speed, the three-phase short will continue to be applied in the hysteresis band 714, until motor speed drops below seventy percent of base speed. If, however, motor speed is increasing from less than seventy percent of base speed, the three-phase short will not be applied in the hysteresis band 714 (and would be applied once motor speed is greater than ninety percent of base speed). In other implementations, with reference to the graph 700, a different fault reaction could be implemented for the indicated fault when the motor speed is below seventy percent of base speed. The hysteresis band 714 can then be implemented such that, if motor speed is increasing, the fault reaction applied below seventy percent of base speed will continue to be applied in the hysteresis band 714, e.g., until motor speed exceeds ninety percent of base speed, at which point the three-phase short would be applied for this example.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:

detecting, by a motor controller, an operating fault associated with operation of a powertrain of an electric vehicle, the powertrain including:

a permanent magnet motor;

a multi-phase inverter that is operationally coupled with the permanent magnet motor; and a rotational position sensor that is operationally coupled with the permanent magnet motor;

determining a classification of the operating fault;

determining a present speed of the permanent magnet motor and determining whether the present speed is increasing or decreasing; and in response to the detection of the operating fault, and based on at least one of the classification of the operating fault and the present speed of the permanent magnet motor, and further based on whether the present speed is increasing or decreasing, performing, by the motor controller, a fault reaction operation, wherein performing the fault reaction operation comprises applying a first fault reaction operation when the present speed is decreasing until the present speed drops below a second threshold speed, and applying a second fault reaction operation when the present speed is increasing until the present speed exceeds a first threshold speed.

2. The method of claim 1, wherein the multi-phase inverter includes a three-phase inverter having a high-side and a low-side, and the fault reaction operation includes one of:

applying a high-side, three-phase short in the three-phase inverter;

applying a low-side, three-phase short in the three-phase inverter;

applying low-side and high-side three-phase open circuit in the three-phase inverter; or setting a torque command for the permanent magnet motor to zero.

3. The method of claim 1, wherein the first threshold speed is less than or equal to a base speed of the permanent magnet motor, the base speed being a speed at which a back electromotive force (EMF) voltage of the permanent magnet motor is greater than a battery voltage of the powertrain of the electric vehicle.

4. The method of claim 1, wherein the operating fault is a first operating fault, the method further comprising:

detecting, by the motor controller, a second operating fault associated with operation of the powertrain of the electric vehicle, performing the fault reaction operation being further based on respective priorities of the first operating fault and the second operating fault, the respective priorities being included in a set of predetermined priorities.

5. The method of claim 1, wherein operating faults, from a highest predetermined priority to a lowest predetermined priority, include:

power electronics operating faults;

speed sensor operating faults;

vehicle speed operating faults;

torque generation operating faults; and powertrain operation warnings.

6. The method of claim 1, wherein the operating fault is detected by a processor included in the motor controller.

7. The method of claim 1, wherein the operating fault is detected by a field programmable gate array (FPGA) included in the motor controller.

8. A vehicle comprising:

a powertrain including:

a permanent magnet motor;

a multi-phase inverter that is operationally coupled with the permanent magnet motor; and a rotational position sensor that is operationally coupled with the permanent magnet motor; and a motor controller configured to:

detect a first operating fault associated with operation of the powertrain and detect a second operating fault concurrently with the first operating fault;

determine a classification of the first operating fault and determine a classification of the second operating fault;

determine a present speed of the permanent magnet motor; and in response to the detection of the first operating fault and the second operating fault, and based on at least one of the classification of the first operating fault, the classification of the second operating fault, and the present speed of the permanent magnet motor, perform a fault reaction operation, wherein performing the fault reaction operation comprises executing a fault reaction operation associated with a highest predetermined priority between the first operating fault and the second operating fault in lieu of executing a fault reaction operation associated with a lower predetermined priority.

9. The vehicle of claim 8, wherein:

the multi-phase inverter includes a three-phase inverter having a high-side and a low-side; and the fault reaction operation includes one of:

applying a high-side, three-phase short in the three-phase inverter;

applying a low-side, three-phase short in the three-phase inverter;

applying low-side and high-side three-phase open circuit in the three-phase inverter; or setting a torque command for the permanent magnet motor to zero.

10. The vehicle of claim 8, wherein:

if the present speed is above a first threshold speed, the motor controller is configured to apply a first fault reaction operation; and if the present speed is a below a second threshold speed, the motor controller is configured to apply a second fault reaction operation that is different than the first fault reaction operation, the second threshold speed being less than the first threshold speed.

11. The vehicle of claim 10, wherein the first threshold speed is less than or equal to a base speed of the permanent magnet motor, the base speed being a speed at which a back electromotive force (EMF) voltage of the permanent magnet motor is greater than a battery voltage of the powertrain of the vehicle.

12. The vehicle of claim 8, wherein operating faults, from a highest predetermined priority to a lowest predetermined priority, include:

power electronics operating faults;

speed sensor operating faults;

vehicle speed operating faults;

torque generation operating faults; and powertrain operation warnings.

13. The vehicle of claim 8, wherein the motor controller includes a processor configured to detect the operating fault.

14. The vehicle of claim 8, wherein the motor controller includes a field programmable gate array (FPGA) configured to detect the operating fault.

15. The vehicle of claim 8, wherein determining the classification of the first operating fault comprises extracting a fault code value associated with the first operating fault, and indexing a look-up table with the fault code value to determine the predetermined priority of the first operating fault relative to a plurality of different potential operating fault conditions.

16. The vehicle of claim 8, wherein the motor controller comprises a microprocessor and a field programmable gate array (FPGA), wherein the microprocessor is configured to determine the classification of the first operating fault, and the FPGA is configured to execute the fault reaction operation.

17. The vehicle of claim 8, further comprising a vehicle control unit (VCU) separate from the motor controller, wherein the motor controller is configured to receive a torque request from the VCU during normal operation, and wherein executing the fault reaction operation comprises overriding the VCU and reducing a torque command to zero.

* * * * *